M. S. BEACH.

MACHINE FOR WETTING AND CUTTING PAPER FOR PRINTING PRESSES.

No. 852. Reissued Nov. 15, 1859.

THE NORRIS PETERS CO., PHOTO-LITHO., WASHINGTON, D. C.

UNITED STATES PATENT OFFICE.

MOSES S. BEACH, OF BROOKLYN, NEW YORK.

MACHINE FOR WETTING AND CUTTING PAPER FOR PRINTING-PRESSES.

Specification forming part of Letters Patent No. 18,032, dated August 25, 1857; Reissue No. 852, dated November 15, 1857.

*To all whom it may concern:*

Be it known that I, MOSES S. BEACH, of the city of Brooklyn, in the county of Kings, in the State of New York, have invented a new and improved mode of wetting paper and of cutting the same into sheets, and feeding the sheets when so cut into printing-machines; and I do hereby declare that the following is a full and exact description thereof, reference being had to the accompanying drawings, and to the letters of reference marked thereon.

The object of this invention is to take paper from an endless sheet or reel, wet or moisten it suitably for purposes of printing, cut it off in sheets of any desired size, and deliver the sheets, either directly or by means of tapes or any suitable intermediate contrivance, to the impression-cylinder of the printing-machine without the intervention of hand labor. It may, however, be applied to other purposes where moistening or cutting into sheets or feeding in of sheets is desirable.

Figure 1:
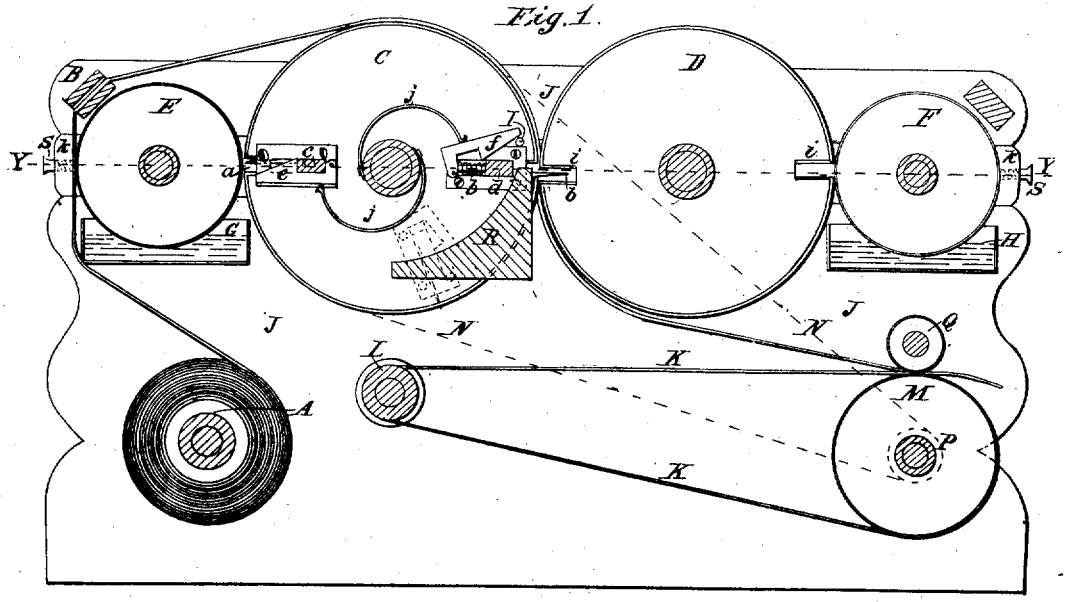
Figure 2:
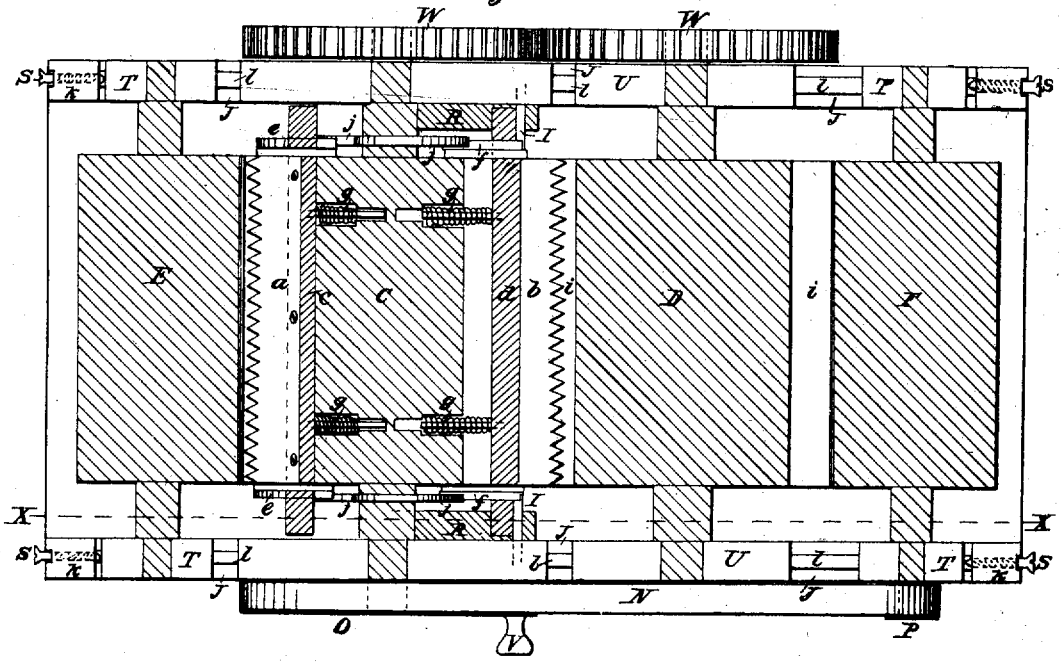

In the accompanying drawings, Figure 1 is a vertical sectional view through the red line X X, Fig. 2; and Fig. 2 is a horizontal sectional view through the red lines Y Y, Fig. 1.

A is a reel, upon which any desired quantity of paper, in a single piece or endless sheet, is wound previous to commencing to operate the machine. The outer end of this reel of paper is first passed through the guide B and then between the cylinders C D, the paper and the direction given to it being indicated by a red line. The machine being then put in operation the pressure together of the cylinders C D, combined with the rotary motion given to them, draws the paper from the reel and, by means of mechanisms hereinafter to be described, wets or moistens it, and cuts it into sheets of a length previously fixed upon, at the same time feeding the sheets to the printing-machine.

Immediately after each cutting—the mechanism for which operates at the point of contact between cylinders C D—the end of the paper falls upon the conducting or guide tapes K, which run over the roller L and cylinder M. These tapes are arranged to move at speed much greater than that of the paper, and serve to prevent it from wrinkling or leaving the direction designed by giving it a slight tension.

At the instant when the quantity of paper required for a single sheet has passed between the cylinders C D the end of it reaches to and is grasped between the cylinder M, which represents the impression-cylinder of the printing-machine, and the roller Q, which represents the drop-roller or fingers connected with such impression-cylinder. The cylinder M and roller Q may, however, be considered as representing parts of any intermediate mechanism designed to receive the sheet and convey it to the printing-machine. At the same instant that the end of the paper is grasped by the cylinder M and the roller Q the cutting mechanism in cylinder C is operated, and a sheet is cut off. Thus the sheet is received into the printing-machine, or into the mechanism by which it is to be delivered to the printing-machine, at the same instant that it is released from the cutting-cylinders, and this receiving and releasing constitutes the feeding of the sheets into the printing-machine.

Should the imperfect operation of the knife leave any fibers of the paper uncut, the increased motion given to the sheet by cylinder M and roller Q over that of the paper from which it is cut instantly severs them by breaking or tearing them asunder.

The cutting mechanism consists of two movable saw-edged knives, *a b*, fixed to the knife-bars *c d*, and placed in cylinder C. These knives, when not confined by the catches *e f*, which operate upon the ends of the knife-bars, are projected beyond the circumference of the cylinder by the spiral springs *g*. The pins I are fixed to the side frames, J, in such position as to trip the catches *e f* at every revolution of cylinder C, and at such a point as that the knives *a b*, thus released from the catches *e f*, will spring out, successively, into the grooves *i* in cylinder D. The paper, being stretched across the grooves *i* at the instant when the knives are released, is first pierced by the saw-points of the knives *a b*, and then cut off by their continued pressure as they are projected into the grooves *i*.

Immediately after each such cutting of the paper the ends of the bar to which the knife is fixed come in contact with the cams R on the side frames, J. The knife-bars *c d*, and with them the knives *a b*, are thus successively pressed back into cylinder C, as shown by red lines in Fig. 1. When the knives *a b* have thus been pressed in far enough to permit of it, the catches *e f* are thrown over the ends of the knife-bore *c d* by the operation of the springs *j*. As the knife-bars *c d* pass away from the cams R they are held by the catches *e f* until the catches again come in contact with the pins I, by which they are tripped, and the knife bars and knives again released.

The wetting or moistening apparatus consists of the tanks G H, partly filled with water, and the rollers E F, which are partly immersed in the water. By the motion of the machine the water is conveyed on the surface of the rollers E F to the cylinders C D, and by them upon the paper. The quantity of water so conveyed is regulated by set-screws S in standards *k*, operating upon the movable bearings T, the rollers E F being thus pressed against cylinders C D, and the surplus water thrown back into the tanks G H. The set-screws S at one end also serve to regulate the pressure of cylinder D against cylinder C, the bearings U of cylinder D being movable. The grooves *l* in the side frames, J, serve as guides for the movable bearings T U.

The motive power for the machine is communicated to the shaft of cylinder C by the handle V on the band-wheel O. The cylinders C D are geared together by the cog-wheels W. The cylinder M is driven by the band N (shown by a dotted line in Fig. 1) passing over band-wheel O on cylinders C and over band-wheel P on cylinder M, The cylinders C D and rollers E F may be covered with cloth or other yielding and water-absorbing material, if found desirable. The quantity of moisture communicated to the paper (by the introduction of one or more additional rollers, placed between cylinders C D and rollers E F) may be reduced still more than is provided for by the use of the set-screws S.

To insure a firm hold of the paper between cylinders C D while it is being cut into sheets, one or more pressure-bars may be introduced. These bars should be placed in cylinder C on one or both sides of the knives *a b*, or in cylinder D on one or both sides of the grooves *i*, the openings for the knives in cylinder C or the grooves *i* in cylinder D being widened to give them space. They should be moved outward a distance of about one-quarter of an inch beyond the circumference of the cylinder upon which they are placed by means of suitable springs, and inward by the pressure of the other cylinder as they are brought toward the point of contact of the two cylinders.

Ordinarily but one knife would be required. Two are shown in the drawings, in order to reduce the distance from cylinder C D to cylinder M and roller Q, so that the whole operation might be more easily shown, the distance between cylinders C D and cylinder M and roller Q being necessarily the length of the sheet to be printed. More than two knives can be used, if found desirable.

Cutting paper with saw-edged knives was extensively practiced in paper-mills twenty-five or thirty years since, the paper being at rest and the knife connected with the frame of the machine and projected by a cam. Revolving straight-edged and winding-edged knives have also been and still are generally used. A revolving saw-edged knife was used by Victor Beaumont, to whom a patent was granted September 6, 1853. He projected the knife by means of a lever and cam. I also use a revolving saw-edged knife, but project it by springs. In this way a quick, almost instantaneous, motion is obtained, a motion better adapted to sever paper than the slower one by cam and lever. The release and projection of the knife by simply tripping the catches *e f* is effected without a noticeable jar or wear of the machine, while the cam and-lever plan involves a blow, which, as motion is thus given to the knife and knife-bar, as well as to the lever and in stretching the springs, becomes a serious obstacle to the rapid movements required in many cases.

The regulation of the moisture to be imparted to the paper, by increasing or diminishing the pressure of the rollers E F upon the cylinders C D, is a great advantage over any other process which I am cognizant of, placing, as it does, that regulation entirely at the command of the person in charge of the machine.

Moistening the paper upon both sides instead of one presents a considerable advantage in cases where, as in this case, the moistening is intended to be followed immediately by printing the paper on both sides. The advantage of leaving that portion of the paper which is to be operated upon by the knife dry, while the other portions are suitably moistened, needs not to be enlarged upon. I effect this by having the openings in cylinder C for the knives come opposite the grooves *i* in cylinder D, thus leaving no surface at that point on either cylinder on which the water can act.

The special advantage of combining the wetting, cutting, and feeding operations with the printing-machine, as herein described, is the prevention of any variation in the motions of successive sheets on their way to the printing-machine, the sheet being thus constantly held within the grasp of unvarying machinery.

I do not wish to be understood as limiting my claim of invention to the special construction herein specified, as equivalents may be substituted for either or all of the elements without changing the principle of my said invention.

I claim as my invention and desire to secure by Letters Patent—

1. The combination, with the printing-machine, of the mechanism herein described, or its equivalent, so arranged as that the paper as it passes along from the reel to be printed upon shall be dampened, as set forth.

2. The combination, with the cylinders C D, or their equivalents, of the adjustable rollers E F, or their equivalents, to supply the moisture for the paper, and also to regulate the quantity of that moisture, as set forth.

3. The combination, with the printing-machine, of the moisture-vessels G H, or their equivalents, as set forth.

4. The combination of the cutting-knife with the dampening roll or cylinder, or its equivalent, as set forth.

5. Simultaneously wetting or moistening both sides of the paper, in the manner substantially as described.

6. Leaving the paper dry at the point or line of cutting, substantially as described.

7. The employment of spring-pressure to project the knife, in the manner substantially as herein shown or described.

8. Retiring the knife within the circumference of the cylinder by means of the cams R, or their equivalents, as set forth.

9. Catching the knife when retired within the circumference of the cylinder C, retaining it while so retired, and releasing it for the operation of cutting by means of the catches *e f*, the springs *j*, and the tripping-pins I, or their equivalents, in the manner substantially as described.

10. The employment of cylinders C D, or their equivalents, to draw the paper from the reel to be afterward cut into sheets and fed into the printing-machine, as set forth.

11. Breaking or tearing asunder any fibers of paper left uncut by the knife by the grasp of cylinder M and roller Q, or their equivalents, as set forth.

12. Giving the conducting or guide tapes K, or their equivalents, a speed greater than that of the paper, as set forth.

13. The combination of the feeding mechanism, cutting apparatus, and the printing-machine, or their equivalents in the said combination, for feeding the paper from a roll to a printing-machine and cutting or partially cutting it into sheets as it passes along to be printed, as set forth.

M. S. BEACH.

Witnesses:
ALBERT TUSCH,
N. O. GORHAM.